US010486885B2

(12) United States Patent
Chen et al.

(10) Patent No.: US 10,486,885 B2
(45) Date of Patent: Nov. 26, 2019

(54) FLEXIBLE PACKAGE WITH EMBOSSED LIQUID CONTAINMENT CELLS

(71) Applicant: BEMIS COMPANY, INC., Neenah, WI (US)

(72) Inventors: Peter M. Chen, Appleton, WI (US); Jay D. Hodson, Hortonville, WI (US); Otacilio T. Berbert, Oshkosh, WI (US)

(73) Assignee: Bemis Company, Inc., Neenah, WI (US)

( * ) Notice: Subject to any disclaimer, the term of this patent is extended or adjusted under 35 U.S.C. 154(b) by 25 days.

(21) Appl. No.: 15/531,508

(22) PCT Filed: Dec. 12, 2014

(86) PCT No.: PCT/US2014/069887
§ 371 (c)(1),
(2) Date: May 30, 2017

(87) PCT Pub. No.: WO2016/093849
PCT Pub. Date: Jun. 16, 2016

(65) Prior Publication Data
US 2017/0267432 A1    Sep. 21, 2017

(51) Int. Cl.
*B65D 81/26*    (2006.01)
*B65D 75/58*    (2006.01)
(Continued)

(52) U.S. Cl.
CPC .............. *B65D 81/264* (2013.01); *A23L 5/15* (2016.08); *B65D 75/30* (2013.01);
(Continued)

(58) Field of Classification Search
CPC .. B65D 81/264; B65D 75/30; B65D 75/5855; B65D 2581/3417; A23L 5/15; A23V 2002/00
(Continued)

(56) References Cited

U.S. PATENT DOCUMENTS 3,026,209 A * 3/1962 Niblack ................. B65D 77/00
206/204
3,040,948 A * 6/1962 Wells .................... B65D 81/264
229/407
(Continued)

FOREIGN PATENT DOCUMENTS

CA      1150681 A1    7/1983
EP      0353334 A1    2/1990
(Continued)

*Primary Examiner* — Chun Hoi Cheung
(74) *Attorney, Agent, or Firm* — Amy L. De Coster

(57) ABSTRACT

The present invention is directed to packages having a flexible top sheet sealed to a flexible embossed bottom sheet The flexible bottom sheet comprises a plurality of embossed peaks and valleys wherein each valley has a defined perimeter with a valley base integrally connected to a valley wall which thereby defines an individual liquid containment cell. The packages according to the present invention are heat resistant to allow food packaged therein to be cooked in a microwave oven such that a substantial amount of water and/or grease released by the food during the cooking process is captured beneath a food contact surface in a plurality of embossed individual liquid containment cells, in preferred embodiments, the package of the present invention is a microwavable form-fill-seal package or microwavable vacuum package for storing and cooking a precooked or cured food product with substantial water and/or fat content.

20 Claims, 9 Drawing Sheets

(51) Int. Cl.
   *B65D 81/34* (2006.01)
   *B65D 75/30* (2006.01)
   *A23L 5/10* (2016.01)

(52) U.S. Cl.
   CPC ..... *B65D 75/5855* (2013.01); *B65D 81/3461* (2013.01); *A23V 2002/00* (2013.01); *B65D 2581/3417* (2013.01)

(58) Field of Classification Search
   USPC .......................................................... 206/204
   See application file for complete search history.

(56) References Cited

U.S. PATENT DOCUMENTS

| | | | | |
|---|---|---|---|---|
| 3,040,949 | A * | 6/1962 | Foote | B65D 81/261 229/407 |
| 3,127,274 | A * | 3/1964 | Weinke | B65D 75/54 229/87.11 |
| 3,580,413 | A * | 5/1971 | Quackenbush | B29C 66/1122 220/660 |
| 3,616,157 | A | 10/1971 | Smith | |
| 3,619,215 | A | 11/1971 | Bard et al. | |
| 3,925,302 | A | 12/1975 | Magder et al. | |
| 4,042,740 | A | 8/1977 | Krueger | |
| 4,103,058 | A | 7/1978 | Humlicek | |
| 4,321,997 | A * | 3/1982 | Miller | B65D 81/264 206/204 |
| 4,533,585 | A * | 8/1985 | Holden | B65D 1/34 220/DIG. 6 |
| 4,587,154 | A | 5/1986 | Hotchkiss et al. | |
| 4,702,377 | A * | 10/1987 | Grone | B65D 81/264 206/557 |
| 4,865,854 | A * | 9/1989 | Larson | A23L 3/01 426/107 |
| 4,873,101 | A | 10/1989 | Larson et al. | |
| 5,022,945 | A * | 6/1991 | Rhodes | B32B 5/32 156/253 |
| 5,024,799 | A | 6/1991 | Harp et al. | |
| 5,096,722 | A | 3/1992 | Bair | |
| 5,346,312 | A | 9/1994 | Mabry et al. | |
| 5,414,248 | A | 5/1995 | Phillips | |
| 5,500,270 | A | 3/1996 | Langdon et al. | |
| 5,655,708 | A | 8/1997 | Gröne | |
| 5,709,897 | A * | 1/1998 | Pearlstein | B65D 81/264 426/106 |
| 5,720,999 | A * | 2/1998 | Lanzani | B65D 81/264 426/129 |
| 5,833,894 | A * | 11/1998 | Lanzani | B65D 81/264 264/46.3 |
| 5,843,502 | A * | 12/1998 | Ramesh | A22C 13/0013 426/127 |
| 5,965,235 | A | 10/1999 | McGuire et al. | |
| 6,019,511 | A * | 2/2000 | Thomas | A47J 47/145 383/101 |
| 6,150,647 | A | 11/2000 | Anderson et al. | |
| 6,216,855 | B1 * | 4/2001 | Grone | B65D 81/264 206/204 |
| 6,415,925 | B1 | 7/2002 | Fux | |
| 6,482,452 | B1 * | 11/2002 | Weller | A23B 4/20 206/204 |
| 8,474,610 | B1 * | 7/2013 | Knight | B65D 81/262 206/204 |
| 8,580,338 | B1 | 11/2013 | Dronzek, Jr. | |
| 8,596,490 | B2 | 12/2013 | Davidson et al. | |
| 2002/0052586 | A1 * | 5/2002 | Shibata | B01J 20/28004 604/372 |
| 2002/0160085 | A1 * | 10/2002 | Tokita | A23L 3/3427 426/124 |
| 2003/0203080 | A1 * | 10/2003 | Garavaglia | B65D 1/48 426/127 |
| 2004/0163973 | A1 * | 8/2004 | Longo | B32B 27/08 206/204 |
| 2004/0175465 | A1 * | 9/2004 | Buelow | A23B 4/00 426/129 |
| 2004/0195115 | A1 * | 10/2004 | Colombo | B65D 75/004 206/204 |
| 2004/0238535 | A1 * | 12/2004 | Mast | B65D 5/302 219/730 |
| 2007/0087089 | A1 | 4/2007 | Heymann et al. | |
| 2007/0160791 | A1 * | 7/2007 | Chou | B32B 3/266 428/36.5 |
| 2008/0110878 | A1 * | 5/2008 | Haskett | A23B 4/08 219/730 |
| 2009/0123756 | A1 | 5/2009 | Hashimoto et al. | |
| 2011/0281001 | A1 | 11/2011 | Kalkunte et al. | |
| 2013/0037437 | A1 * | 2/2013 | Tsai | B65D 65/466 206/524.2 |
| 2013/0105471 | A1 | 5/2013 | Hach | |
| 2013/0334090 | A1 * | 12/2013 | Drew | B65D 65/466 206/524.3 |

FOREIGN PATENT DOCUMENTS

| | | |
|---|---|---|
| EP | 0612235 B1 | 8/1994 |
| EP | 1556285 B1 | 7/2005 |
| WO | 9621556 A1 | 7/1996 |
| WO | 0102093 A2 | 1/2001 |
| WO | 2004039683 A1 | 5/2004 |

\* cited by examiner $AREA_{LD}$ (Large Diamond) = ½ × ($d_1$ × $d_2$)   (I)

$AREA_{SD}$ (Small Diamond) = ½ × ($d'_1$ × $d'_2$)   (II)

% Reduced Area = ($AREA_{LD}$ - $AREA_{SD}$)/$AREA_{LD}$ × 100%   (III)

FLEXIBLE PACKAGE WITH EMBOSSED LIQUID CONTAINMENT CELLS

BACKGROUND OF THE INVENTION

The present invention relates generally to flexible packaging articles and more particularly, to flexible packages for packaging a food product which retain water and/or grease released during the cooking cycle formed from a first flexible top sheet and a second flexible bottom sheet having embossed liquid containment cells.

Many people consider it desirable to cook food products by microwave energy. It has become increasingly prevalent to cook such food products by placing the food package in a microwave and to cook the food product in the package. During the heating process, many food products, particularly, meat, poultry, fish and the like release water, juices, oils, fats, grease, and blood (collectively referred to herein as "exudate") during the cooking process. Typically, the liquid exudate pools beneath the food item and is collected by a separate absorbent pad. While some pooling may enhance browning and crisping of the food item, excessive pooling of liquid exudate may impede browning and crisping. Cooking bacon in a microwave oven has certain particular drawbacks. Because of its high fat content, bacon is especially messy to cook in a microwave oven. Bacon should rest on and be covered by paper towels in order to reduce splattering of the grease within the oven. Naturally, this step is inconvenient and produces messy paper towels to handle and dispose of after cooking. Thus, there is a need for a package that retains the food item liquid exudate during storage and/or cooking without the use of an absorbent pad. There is further a need for a package that retains liquid exudate which enhances browning and crisping of the food item during microwave oven cooking.

SUMMARY OF THE INVENTION

The present invention is directed to packages having a flexible top sheet sealed to a flexible embossed bottom sheet. The flexible top sheet may be sealed to the flexible embossed bottom sheet by forming a permanent or peelable heat seal between the peripheral edges of each sheet through techniques known to those skilled in the art. Each of the top and bottom sheets has a thickness of between 12.7 µm and 305 µm (0.5 mil and 12 mil), a bending resistance of between 5 and 5000 Gurley Units in either the machine or transverse direction, and a heat resistance to melting up to a temperature of at least 100° C. (212° F.). The flexible bottom sheet comprises a plurality of embossed peaks and valleys wherein each valley has a defined perimeter with a valley base integrally connected to a valley wall which thereby defines an individual liquid containment cell. The flexible top sheet may also be embossed if desired to further enhance retention of liquids.

In accordance with the present invention, the bottom sheet comprises a food-contact surface having a surface topography formed by embossing which significantly increases the liquid retaining capacity of the bottom sheet over its pre-embossed state. To achieve sufficient liquid retaining capacity, the food-contact surface has a reduced food-contact surface area that reduces its pre-embossed food-contact surface area by at least 20%, at least 25%, at least 30%, at least 35%, at least 40%, at least 45%, or at least 50%. The effectiveness of the reduced food-contact surface area depends to a significant extent on the geometry of each of the liquid containment cells, the number of liquid containment cells, and/or the volume of each liquid containment cell.

In a preferred embodiment, the individual liquid containment cells have a polygon shape. It has been discovered that it is advantageous to provide a plurality of liquid containment cells having a polygon shape. In preferred embodiments, the bottom sheet comprises a plurality of the individual liquid containment cells having a polygon shape formed into a pattern which extends across a portion or the entire surface area of the bottom sheet. While it is contemplated that the polygon may include any geometry including, but not limited to squares, circles, diamonds, hexagons, octagons, double cross-hatches and combinations thereof. In a preferred embodiment, each of the individual liquid containment cells has a diamond shape. In another preferred embodiment, each of the individual liquid containment cells has a hexagon shape. It is further contemplated to provide the bottom sheet with a plurality of individual liquid containment cells and separate channels from the plurality of cells which may direct liquid away from or to different areas of the bottom sheet.

Further in accordance with the present invention and in a preferred embodiment, the number of individual liquid containment cells per square inch of the bottom sheet is at least 10. In another preferred embodiment, the number of individual liquid containment cells per square inch of the bottom sheet is at least 25. In yet another preferred embodiment, the number of individual liquid containment cells per square inch of the bottom sheet is at least 50.

Further aspects of the invention relate to the volume of each individual liquid containment cell by created by embossing the bottom sheet of the package of the present invention. In one embodiment, to insure sufficient liquid containment capacity of the package, the bottom sheet is embossed such that each of the individual liquid containment cells includes a total volume of at least 1.64 mm$^3$ (0.0001 in$^3$), at least 3.3 mm$^3$ (0.0002 in$^3$), or at least 4.7 mm$^3$ (0.00029 in$^3$).

Advantageously, the package according to the present invention is heat resistant to allow food packaged therein to be cooked in a microwave oven such that a substantial amount of water and/or grease released by the food during the cooking process is captured beneath a food contact surface in a plurality of embossed individual liquid containment cells. In preferred embodiments, the package of the present invention is a microwavable, ovenable, form-fill-seal or vacuum package for storing and cooking a fresh, precooked or cured food product with substantial water and/or fat content. The package of the present invention is particularly useful for storing and cooking bacon which when uncooked typically contains in the range of 24 to 33 percent water and 37 to 60 percent solidified fat with the remaining mass being solids. The package is also useful as a heat-and-serve type package for other precooked meat products such as, but not limited to sausages, hams, or burgers and the like.

BRIEF DESCRIPTION OF THE DRAWINGS

Further features and advantages of the present invention will become apparent from the following detailed description, taken in combination with the appended drawings, in which.

DEFINITIONS

Figure 1:
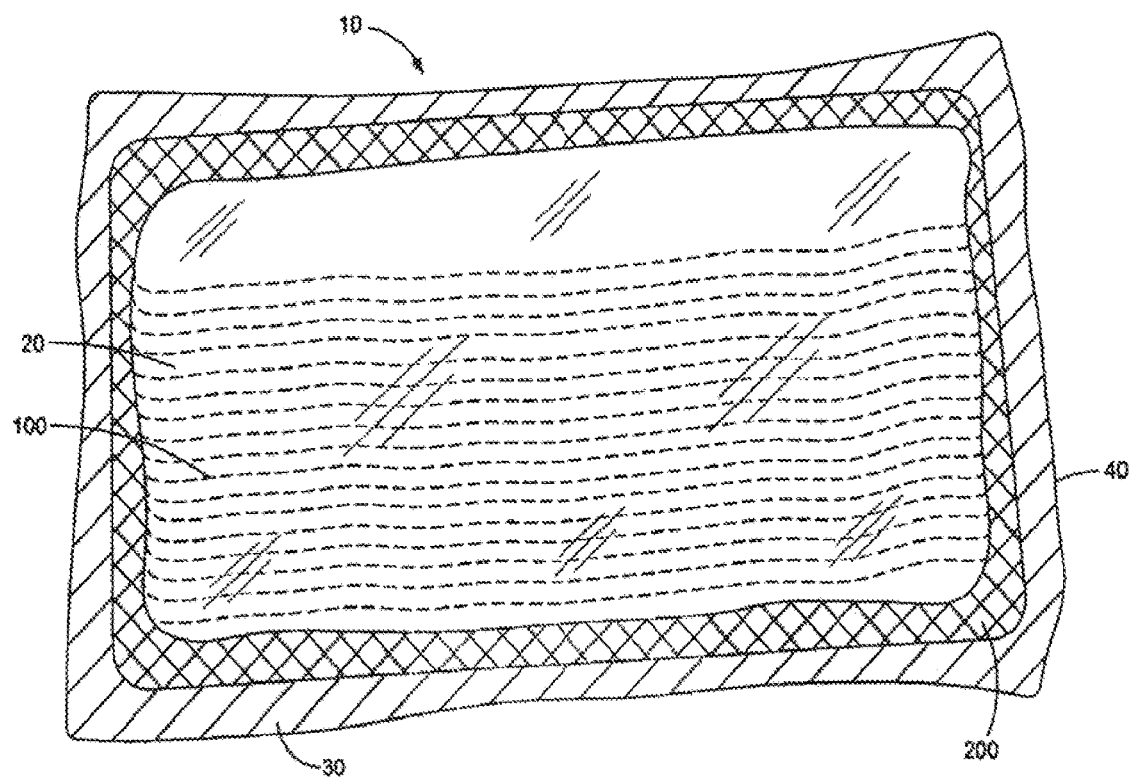
FIG. 1 shows a schematic view of one preferred embodiment of a package according to the present invention.

As utilized herein, the term "flexible" refers to materials which are capable of being flexed or bent, especially repeatedly, such that they are pliant and yieldable in response to externally applied forces. Flexible is thus substantially opposite in meaning to the terms inflexible, rigid or unyielding. Materials and structures which are flexible, therefore, may be altered in shape and structure to accommodate external forces and to conform to the shape of objects, particularly, food products brought into contact with them without losing their integrity. For example, in one embodiment, the flexible packages of the present invention may readily conform to the shape of a food product when a vacuum is drawn in the space formed between the top and bottom sheets. The flexible sheets of the present invention are capable of conforming to the shape of a product when a vacuum is applied therebetween without substantial deformation of the surface topography of the embossed bottom sheet. Flexibility may be defined as any material having sufficient flexibility to permit the fabrication of flexible pouches, bags and the like on conventional packaging equipment such as for example, but not limited to vertical form-fill-seal or horizontal form-fill-seal manufacturing equipment. A precondition for such flexibility is when each of the top and bottom sheets of the present invention exhibits a bending resistance (or stiffness) of between 5 and 5000 Gurley Units in either the machine and/or transverse direction. Industry standards for measuring the bending resistance (or stiffness) adopted by the Technical Association of the Pulp and Paper Industry (TAPPI) can be used to characterize the bending resistance of the laminates of the present invention. Bending resistance can be measured in accordance with T 543 TAPPI test method. For example, the Gurley Stiffness value can be measured via a Gurley Stiffness Tester, manufactured by Gurley Precision Instruments of Troy, N.Y. The Gurley Stiffness Tester measures the externally applied moment required to produce a given deflection of a strip of material of specific dimensions fixed at one end and having a concentrated load applied to the other end. The results are obtained as "Gurley Stiffness Units", which can be readily converted into force units, mNewton (mN) by multiplying the "Gurley Stiffness Units" by $9.807 \times 10^{-3}$. In one preferred embodiment, each of the top and bottom sheets of the present invention exhibits a bending resistance (or stiffness) of between 5 and 2000 Gurley Units. In certain embodiments, flexibility may be defined when each of the top and bottom sheets of the packages of the present invention exhibits a total thickness of between 12.7 µm and 305 µm (0.5 mil and 12 mil).

As used herein, the phrases "heat resistant" and/or "heat resistance" refer to materials used to form the top and bottom sheets of the present invention which exhibit no substantial deformation upon heating the material to a temperature of at least 100° C. (212° F.). In certain embodiments of the present invention, the term "heat resistant" may also refer to the ability of the top and bottom sheets to withstand the temperatures generated in a 700 watt microwave oven during cooking without melting or degrading when in contact with a food item. When the sheets of the present invention are made into the package, temperatures of above 100° C. or more may be encountered under microwave cooking conditions, so the sheets should maintain their integrity at such temperatures. In a preferred embodiment, the top and bottom sheets are both heat resistant to temperatures generated in a conventional microwave oven and microwave transparent. The term "microwave transparent" refers to materials which do not readily convert the incident microwave radiation to heat. In contrast, microwave susceptor material readily converts microwave energy to heat.

"Peelable" and like terminology is used herein to refer to any substrate interface which are engineered to be readily peelable (or delaminate within a particular film layer or between two film layers) without uncontrolled or random tearing or rupturing the packaging materials which may result in premature destruction of the packaging film and package made therefrom. A peelable interface or peelable layer is one that can be manually peeled apart to open a package without resort to the use of a knife or other implement to tear or rupture the web. In the present invention, the peelable layer or peelable interface must have seal strengths sufficient to prevent failure of the seal during the normal stuffing process and further normal handling and transport of the packaged article. The seal strengths must also be low enough to permit manual opening of the seal. Preferably, parameters such as choice of materials and lamination conditions may be used to adjust the seal strength to the desired level for the particular package web and packaging application. A peelable layer or peelable interface according to the present invention has an initial seal strength set to a maximum value of 2,500 gram-force/inch and a propagation seal strength (i.e., tearing force) set to a range from between 60 and 2,500 gram-force/inch. In contrast, a non-peelable layer or non-peelable interface is not adapted to peel apart or delaminate in a controlled manner as described above. Non-peelable layers or non-peelable interfaces have initial seal strengths of at least 2,000 gram-force/inch, typically at least 2,500 gram-force/inch.

DETAILED DESCRIPTION OF THE INVENTION

Figure 2:
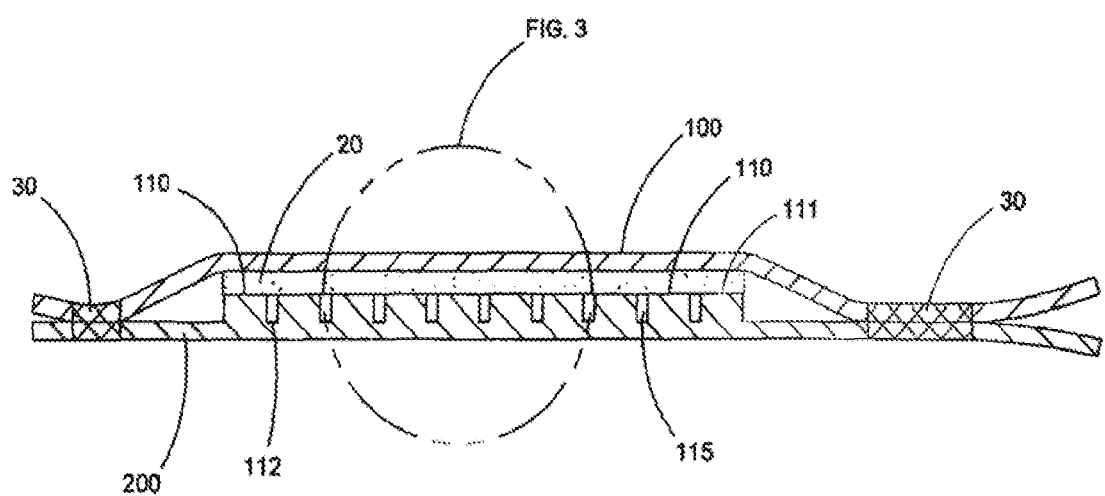
FIG. 2 shows an enlarged cross-sectional schematic illustration of the package depicted in FIG. 1.
Figure 3:
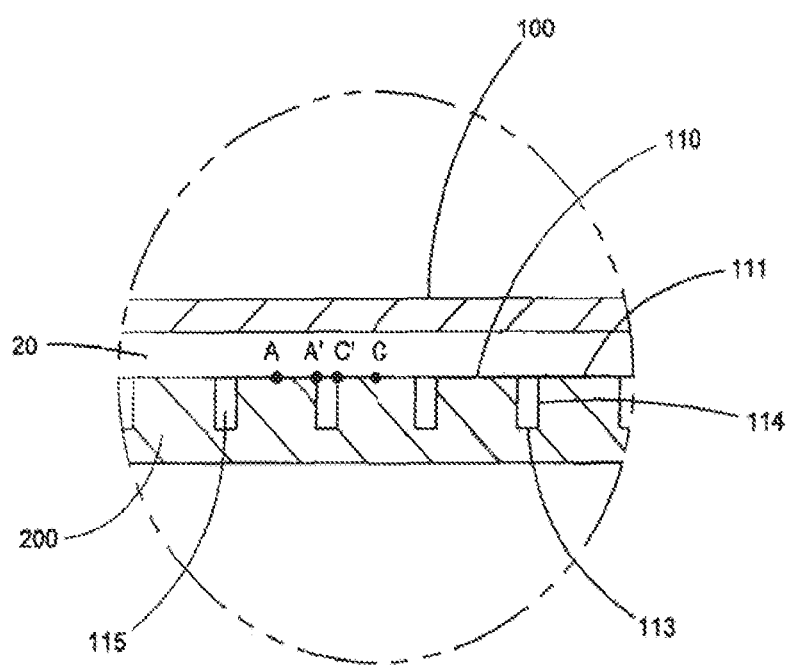
FIG. 3 shows an enlarged cross-sectional view of FIG. 2.
Figure 4:
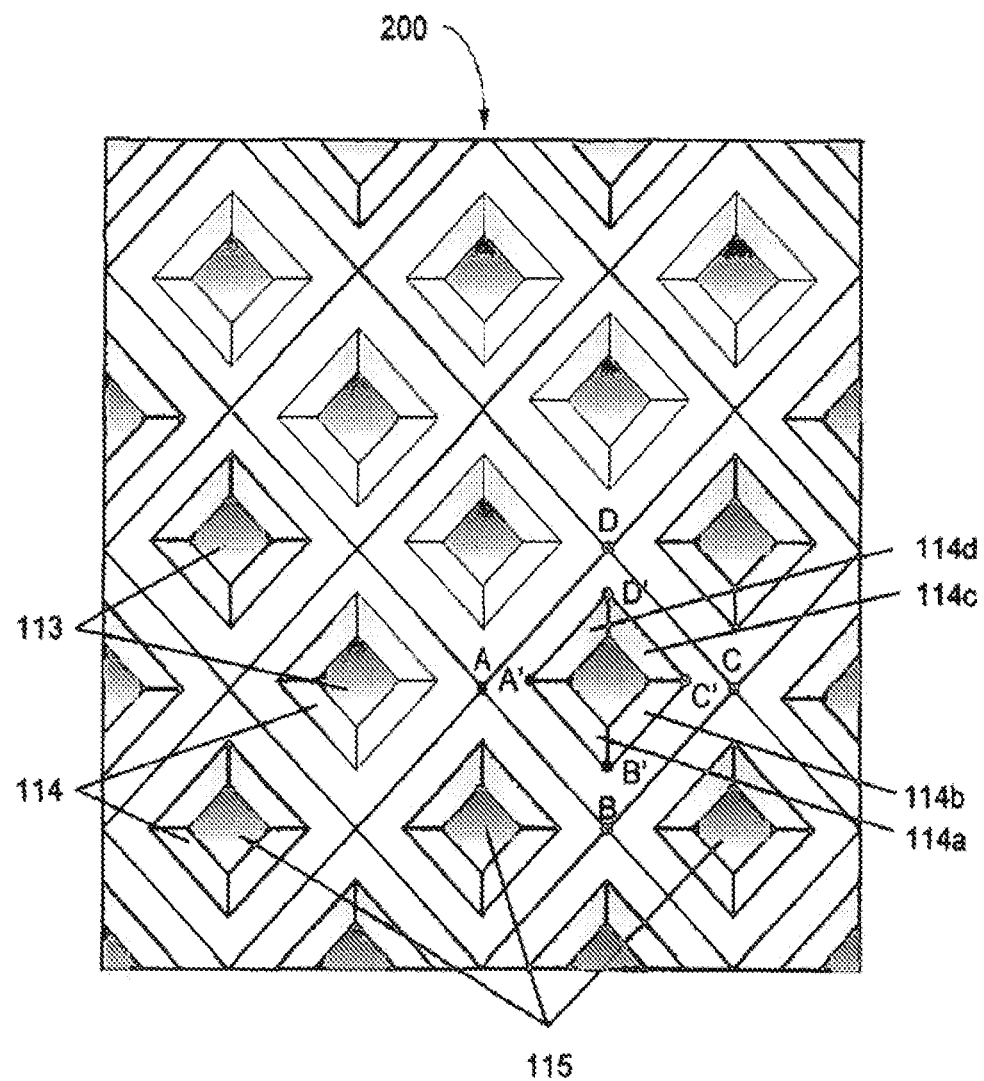
FIG. 4 shows an enlarged schematic view of one preferred embodiment of an embossed bottom sheet having a diamond pattern according to the present invention.

Referring to FIGS. 1-3, a flexible package 10 is generally indicated in accordance with an embodiment of the present invention. FIG. 1 depicts package 10 has having a first flexible top sheet 100 sealed to a second flexible embossed bottom sheet 200 enclosing a food product, (e.g., bacon) 20 containing a substantial amount of solidified fat and water. Package 10 includes a heat seal 30, preferably a hermetic heat seal which seals the top sheet 100 to the bottom sheet 200 and extends continuously around the periphery 40 of the package. As shown in FIGS. 2-4, bottom sheet 200 has an embossed food-contact surface 110 facing the food product.

Figure 5:
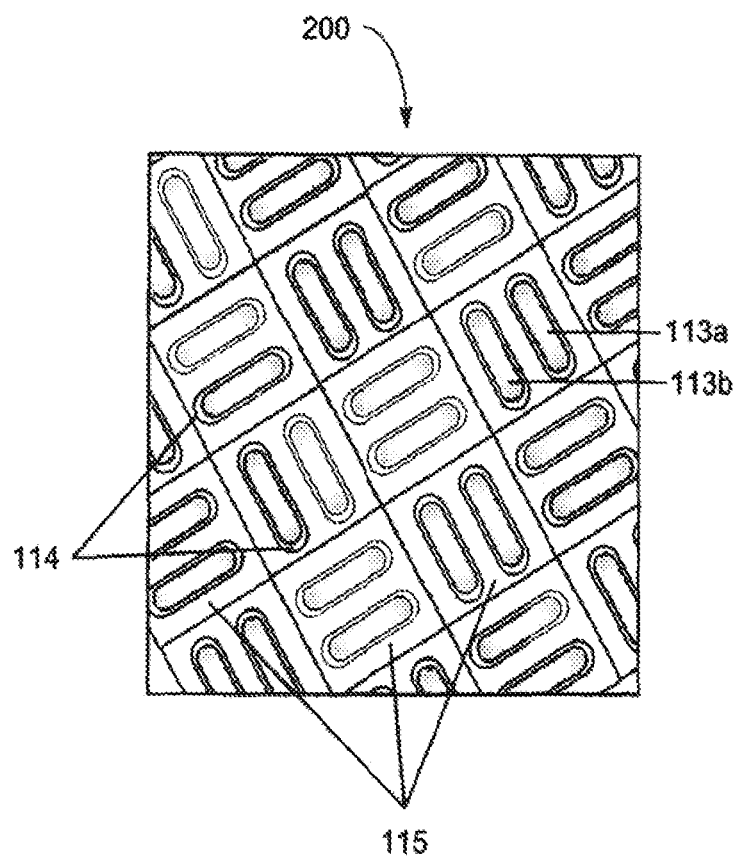
FIG. 5 shows an enlarged schematic view of one preferred embodiment of an embossed bottom sheet having a double cross-hatched pattern according to the present invention.
Figure 6:
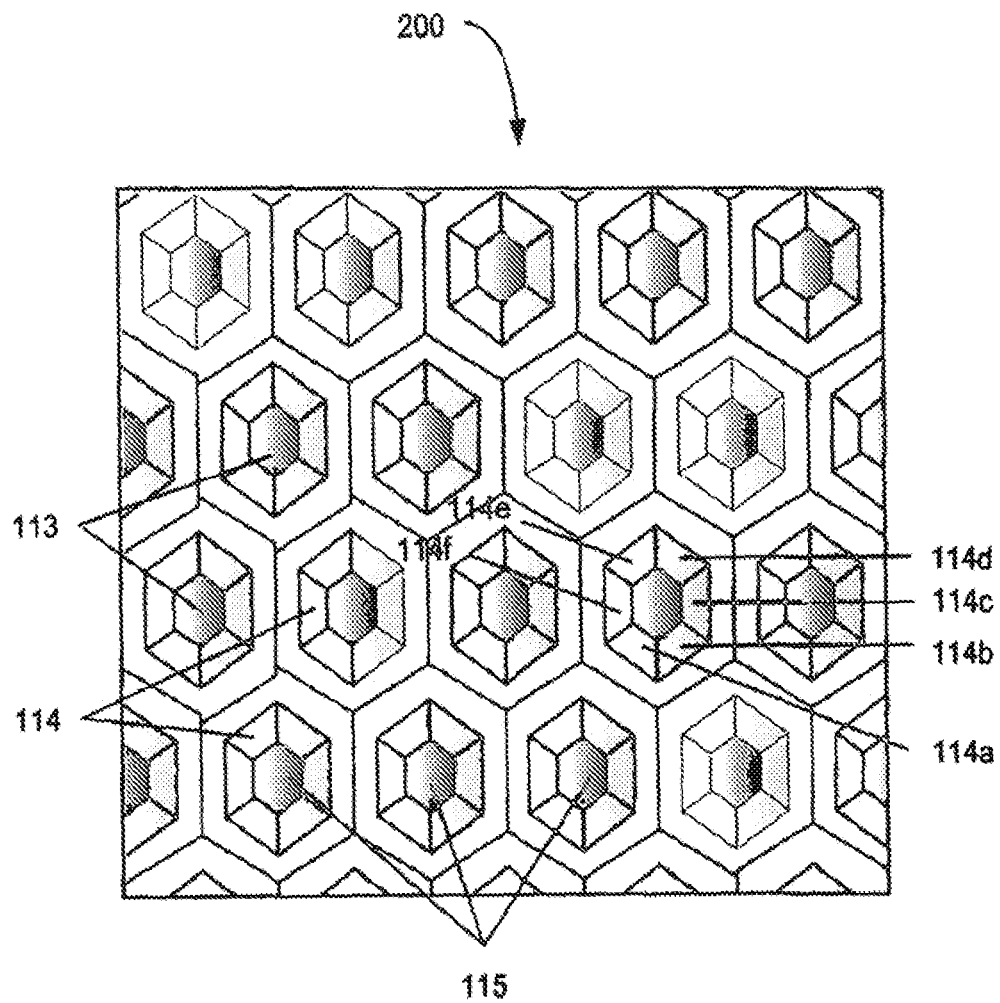
FIG. 6 shows an enlarged schematic view of one preferred embodiment of an embossed bottom sheet having a hexagon pattern according to the present invention.

The embossed food-contact surface 110 includes a three-dimensional surface topography of peaks 111 and valleys 112 wherein each valley has a defined perimeter with a valley base 113 integrally connected to a valley wall 114. Each valley base and connected valley wall defines an individual liquid containment cell 115. The individual liquid containment cell 115 may have any shape, size and/or depth as desired depending on the amount of water and/or grease inherent to the packaged food product. It is advantageous to provide a plurality of individual liquid containment cells having a polygon shape. In preferred embodiments, the bottom sheet comprises a plurality of the individual liquid containment cells having a polygon shape formed into a pattern which extends across a portion or the entire surface area of the bottom sheet. As depicted in FIG. 4, there is an enlarged partial view of one preferred embodiment of a bottom sheet 200 which includes a plurality of individual liquid containment cells 115 having a diamond shape. Each individual containment cell 115 includes a valley base 113 surrounded by a valley wall 114. In this particular preferred example, each of the individual liquid containment cells includes four discrete valley walls 114a, 114b, 114c, and 114d. FIG. 5 illustrates another preferred embodiment of a bottom sheet 200 which includes a plurality of individual liquid containment cells 115 having a double cross-hatched shape. Each individual containment cell 115 includes two valley bases 113a and 113b where each valley is surrounded by a valley wall 114. FIG. 6 illustrates another preferred embodiment of a bottom sheet 200 which includes a plurality of individual liquid containment cells 115 having a hexagon shape. Each individual containment cell 115 includes a valley base 113 surrounded by a valley wall 114. In this particular preferred example, each of the individual liquid containment cells includes six discrete valley walls 114a, 114b, 114c, 114d, 114e, and 114f.

Figure 7:
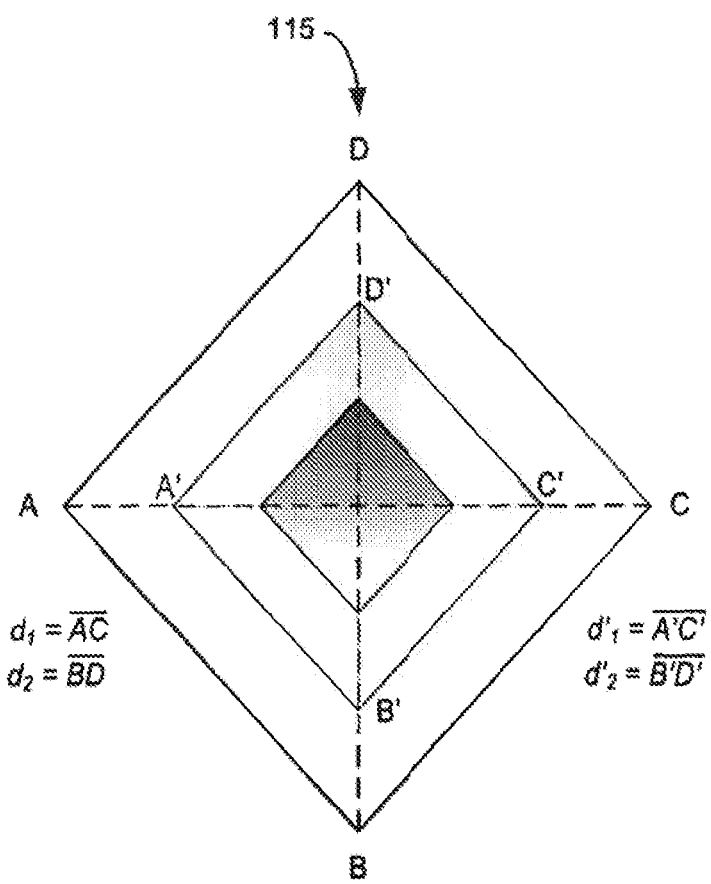
FIG. 7 shows an enlarged schematic view of one individual liquid containment cell illustrated in FIG. 4.

In order to achieve sufficient liquid retaining capacity, the food-contact surface has a reduced food-contact surface area that reduces its pre-embossed food-contact surface area by at least 20%, at least 25%, at least 30%, at least 35%, at least 40%, at least 45%, or at least 50%. One method of determining the percentage of reduction of the reduced food-contact surface area relative to the pre-embossed food-contact surface area for a bottom sheet having a plurality of individual liquid containment cells may be calculated based on the dimensions of an individual liquid containment cell as is shown in FIG. 7. In this particular embodiment, the individual liquid containment cell has a hexagon shape and the area of the pre-embossed food-contact surface or $AREA_{LD}$ may be calculated using formula (I) in FIG. 6 by measuring the length of line AC ($d_1$) between points A and B, the length of line BD ($d_2$) between points B and D, multiplying these distances together and finally, dividing the product in half. Typically, points A, B, C and D are each a vertex of four abutting containment cells as illustrated in FIG. 4. Points A and B may also be a midpoint between two adjacent valleys as illustrated in FIG. 3. The area of the embossed area or $AREA_{SD}$ which essentially represents the area lying below the food-contact surface 111 may be calculated using formula (II) in FIG. 6 by measuring the length of line A'C' ($d'_1$) between points A' and B', the length of line B'D' ($d'_2$) between points B' and D', multiplying these distances together and finally, dividing the product in half. Points A', B', C' and D' are each a vertex of two abutting valley walls, 114a and 114b within a single individual liquid containment cell as shown in FIG. 4. The percentage of reduction of the reduced food-contact surface area relative to the pre-embossed food-contact surface area is calculated by using formula (III) in FIG. 6 by subtracting the amount of $AREA_{SD}$, the embossed area from $AREA_{LD}$, the pre-embossed area, dividing the remainder by $AREA_{LD}$, and finally multiplying the dividend by 100%.

Figure 8:
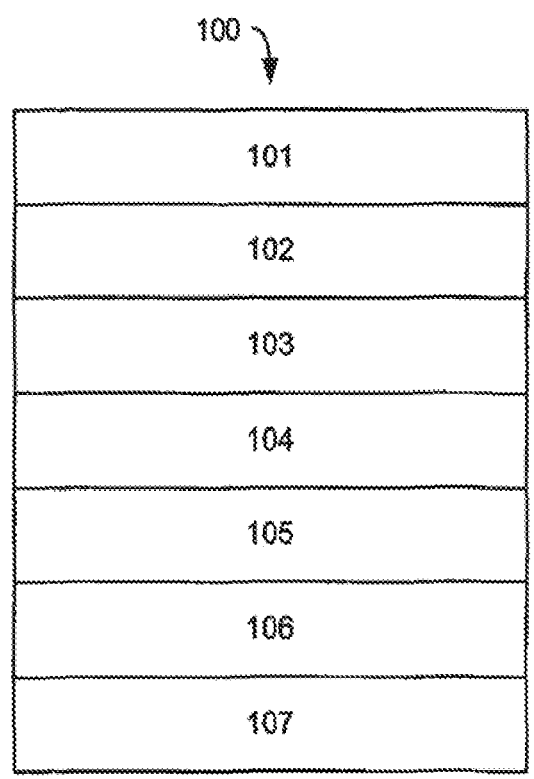
FIG. 8 is an enlarged cross-sectional schematic illustration of one preferred embodiment of a top sheet according to the present invention.

Turning now to FIG. 8, there is shown a cross-sectional view of one preferred embodiment of a top sheet 100. In this particular example, first film 100 includes an exterior sealant layer 101 which also functions as a frangible layer comprising a blend of a heat sealing material and a material which is incompatible with the heat sealing material, a second layer 102 positioned adjacent to the exterior sealant layer 101 which comprises a polyolefin resin, a third layer 103 positioned adjacent to second layer 102 and comprising a tie or adhesive material, a fourth layer 104 positioned adjacent to the third layer 103 which comprises an oxygen barrier material, and a fifth layer 105 positioned adjacent to the fourth layer 104 and comprising a polyamide or blend of polyamides, a sixth layer 106 positioned adjacent to fifth layer 105 and comprising a tie or adhesive material, and a seventh exterior layer 107 adjacent to sixth layer 106 and comprising an abuse material. While this example of first flexible heat shrinkable film 100 is depicted as having seven layers, it should be understood that first film 100 may be formed as having any number of layers depending upon the desired properties of the final film. Thus first film 100 may be constructed from 1, 2, 3, 4, 5, 6, 7, 8 or more layers.

Figure 9:
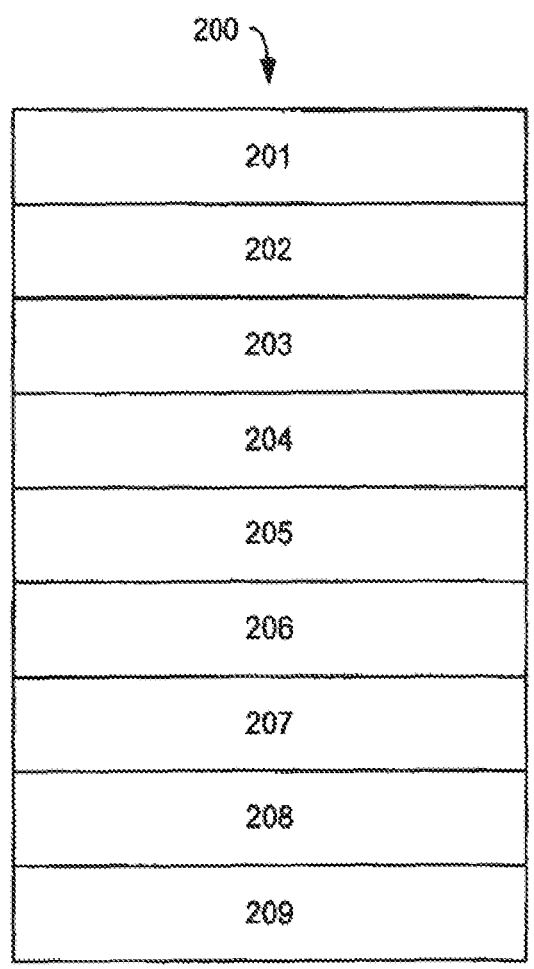
FIG. 9 is an enlarged cross-sectional schematic illustration of one preferred embodiment of a bottom sheet according to the present invention.

FIG. 9 depicts a cross-sectional view of one preferred embodiment of a bottom sheet 200. In this example, second film 200 includes an exterior sealant layer 201 comprising a heat sealing material, a second layer 202 positioned adjacent to the exterior sealant layer 201 which comprises a polyolefin resin, a third layer 203 positioned adjacent to second layer 202 and comprising a polyolefin resin, a fourth layer 204 positioned adjacent to the third layer 203 which comprises a tie or adhesive material, a fifth layer 205 positioned adjacent to the fourth layer 204 and comprising a polyamide or blend of polyamides, a sixth layer 206 positioned adjacent to fifth layer 205 and comprising an oxygen barrier material, a seventh exterior layer 207 adjacent to sixth layer 206 and comprising a polyamide or blend of polyamides, an eighth layer 208 positioned adjacent to seventh layer 207 and comprising a tie or adhesive material, and a ninth exterior layer 209 positioned adjacent to eighth layer 208 and comprising an abuse material. While this example of second flexible non-heat shrinkable film 200 is depicted as having nine layers, it should be understood that second film 200 may be formed as having any number of layers depending upon the desired properties of the final film.

As used herein, the term "sealant" refers to a layer which is heat sealable to itself or to other materials, i.e., be capable of fusion bonding by conventional heating means which generate sufficient heat on at least one film contact surface for conduction to the contiguous film contact surface and formation of a bond interface therebetween without loss of the film integrity. Advantageously, the bond interface must be sufficiently thermally stable to prevent gas or liquid leakage therethrough. Suitable sealant materials include, but are not limited to polyolefins, such as polyethylenes (PE), including low density polyethylene (LDPE), linear low density polyethylene (LLDPE), very low density polyethylene (VLDPE), and ultra-low density polyethylene (ULDPE); ethylene vinyl acetate copolymers (EVA); ionomers; and blends thereof.

The term "adhesive layer," or "tie layer" refers to a layer or material placed on one or more layers to promote the adhesion of that layer to another surface. Typically, adhesive layers are positioned between two layers of a multilayer film to maintain the two layers in position relative to each other and prevent undesirable delamination. Unless otherwise indicated, an adhesive layer can have any suitable composition that provides a desired level of adhesion with the one or more surfaces in contact with the adhesive layer material. Optionally, an adhesive layer placed between a first layer and a second layer in a multilayer web may comprise components of both the first layer and the second layer to promote simultaneous adhesion of the adhesive layer to both the first layer and the second layer to opposite sides of the adhesive layer. Tie or adhesive layers may be incorporated into a film or laminate by any of the well-known processes for making multilayer structures such as coextrusion, adhesive lamination and the like. Typical tie materials include, but are not limited to anhydride or carboxylic acid modified polyolefins, particularly, maleic anhydride modified polyolefins such as maleic anhydride modified low density polyethylene, maleic anhydride modified linear low density polyethylene, maleic anhydride modified high density polyethylene, maleic anhydride modified ethylene vinyl acetate copolymers and blends thereof. Tie layer materials may further include a blend of an unmodified polyolefin or unmodified ester copolymer or unmodified ethylene acid copolymer and a modified polyolefin or modified ester copolymer or modified ethylene acid copolymer.

Frangible or peelable film layers are well known in the art and are disclosed in U.S. Pat. No. 4,944,409 (Busche et al.); U.S. Pat. No. 4,875,587 (Lulham et al.); U.S. Pat. No. 3,655,503 (Stanley et al.); U.S. Pat. No. 4,058,632 (Evans et al.); U.S. Pat. No. 4,252,846 (Romesberg et al.); U.S. Pat. No. 4,615,926 (Hsu et al.) U.S. Pat. No. 4,666,778 (Hwo); U.S. Pat. No. 4,784,885 (Carespodi); U.S. Pat. No. 4,882,229 (Hwo); U.S. Pat. No. 6,476,137 (Longo); U.S. Pat. No. 5,997,968 (Dries, et al.); U.S. Pat. No. 4,189,519 (Ticknor); U.S. Pat. No. 5,547,752 (Yanidis); U.S. Pat. No. 5,128,414 (Hwo); U.S. Pat. No. 5,023,121 (Pockat, et al.); U.S. Pat. No. 4,937,139 (Genske, et al.); U.S. Pat. No. 4,916,190 (Hwo); and U.S. Pat. No. 4,550,141 (Hoh), the disclosures of which are incorporated herein in their entirety by reference thereto. In one preferred embodiment, a frangible layer is included in top sheet 100. In another preferred embodiment, a frangible layer is included in bottom sheet 200. Non-limiting examples of such blends combine polyethylene such as low density polyethylene, linear low density polyethylene or ethylene vinyl acetate copolymer as a major component with a polybutylene-1 as a minor component. The major component of these blends is present in an amount of at least 50%, 60%, 70%, 80% or 90% by weight relative to the total weight of the frangible layer. Typically, these frangible layers provide a relatively weak bond to an adjacent layer whereby the interface between these layers delaminates upon application of force perpendicular to the plane of the interface.

Oxygen barrier materials may include, but are not limited to, polyamides, ethylene vinyl alcohol copolymer (EVOH), polyvinylidene chloride (PVdC), metal or metal oxide coated polymer substrates and the like. In one preferred embodiment of the present invention, both the top and bottom sheets, 100 and 200, include at least one layer comprising an oxygen barrier material. In another preferred embodiment, both the top and bottom sheets, 100 and 200, include at least two layers each comprising an oxygen barrier material. In yet another preferred embodiment, both top and bottom sheets, 100 and 200, include at least three layers each comprising an oxygen barrier material. However, it should be noted that the present invention does not necessarily require that one or both of the top and bottom sheets, 100 and 200, include a layer comprising an oxygen barrier material. But, those skilled in the art will recognize that when packaging an oxygen sensitive product which may include many food items, at least one layer of an oxygen barrier material may be required in one or both films of the present invention to provide a barrier against the ingress of oxygen.

Abuse materials may include, but are not limited to, polyolefins such as polyethylenes (PE) and polypropylenes (PP); polyamides; polyamide blends; polyesters including aromatic and aliphatic polyesters, such as polyethylene terephthalates (PET), polyethylene isophthalates, polyethylene naphthalates; oriented polyamides and oriented aromatic polyesters. Typically, abuse materials provide additional moisture and/or chemical barrier protection to a film. Those skilled in the art will recognize that abuse materials also provide a sufficiently smooth surface for the printing of indicia or graphics that appear on most packaged food or non-food products. In one preferred embodiment of the present, the abuse layer of at least one of the top and bottom sheets, 100 or 200, includes printed indicia.

WORKING EXAMPLES OF FILM STRUCTURES

In the following example, the film structure for top sheet 100 depicted in FIG. 8 was produced using a blown film co-extrusion apparatuses, and methods which are well known to those skilled in the art. The blown film co-extrusion film apparatus includes a multi-manifold flat die head for film through which the film composition is forced and formed into a flat sheet. The sheet is immediately quenched e.g., via cooled water bath, solid surface and/or air, and then formed into a film which is then be axially slit and unfolded to form a flat sheet. Sheet 100 of the invention may be uniaxially oriented or biaxially oriented if desired. It should be noted that the physical properties of the sheet may vary from those of the polymer blend, depending on the film forming techniques used. Those skilled in the art will appreciate that the thickness of individual layers for sheet 100 may be adjusted based on desired end use performance, resin or copolymer employed, equipment capability and other factors. In at least one preferred embodiment, the top sheet 100 has a thickness of between a thickness of between 12.7 μm and 305 μm (0.5 mil and 12 mil), a bending resistance of between 5 and 5000 Gurley Units in either the machine or transverse direction, and a heat resistance to melting up to a temperature of at least 100° C. (212° F.).

In the following example, the film structure for a bottom sheet 200 depicted in FIG. 9 was produced using a blown film co-extrusion apparatuses, and methods which are well known to those skilled in the art. The blown film co-extrusion film apparatus includes a multi-manifold flat die head for film through which the film composition is forced and formed into a flat sheet. The sheet is immediately quenched e.g., via cooled water bath, solid surface and/or air, and then formed into a film which is then be axially slit and unfolded to form a flat sheet. Sheet 200 of the invention may be uniaxially oriented or biaxially oriented if desired. It should be noted that the physical properties of the sheet may vary from those of the polymer blend, depending on the film forming techniques used. Those skilled in the art will appreciate that the thickness of individual layers for bottom sheet 200 may be adjusted based on desired end use performance, resin or copolymer employed, equipment capability and other factors. In at least one preferred embodiment, the bottom sheet 200 has a thickness of between a thickness of between 12.7 µm and 305 µm (0.5 mil and 12 mil), a bending resistance of between 5 and 5000 Gurley Units in either the machine or transverse direction, and a heat resistance to melting up to a temperature of at least 100° C. (212∞ F.). In at least another preferred embodiment, the food-contact surface of the bottom sheet 200 is corona treated.

Top Sheet

This example is one embodiment of a first flexible top sheet 100 of the present invention having a layer sequence (in the order as shown below) and layer compositions as described below and as illustrated in FIG. 8. Reported below is the layer composition relative to the total weight of the layer.

Layer 101 (Sealant & Frangible): 82.5 wt.-% of an ionomer-SURLYN® 1601 (du Pont de Nemours and Company, Wilmington, Del., U.S.A.)+17.5 wt.-% of a polybutylene-Polybutene-1 PB 8640M (Equistar Chemicals, LP, Houston, Tex., USA).

Layer 102: 100 wt.-% of a linear low density polyethylene (LLDPE)-ExxonMobil™ LLDPE 1001.32 (ExxonMobil Chemical Company, Houston, Tex., USA).

Layer 103: 100 wt.-% of an anhydride modified linear low density polyethylene-Bynel® CXA 41E710 (E.I. du Pont de Nemours and Company, Inc., Wilmington, Del., USA).

Layer 104: 100 wt.-% of an ethylene vinyl alcohol copolymer (EVOH)-Soarnol™ AT 4403 (Soarus L.L.C., Arlington Heights, Ill., USA).

Layer 105: 100 wt.-% of a nylon 6-Ultramid® B36 01 (BASF Polyamides and Intermediates, Freeport, Tex., USA).

Layer 106: 90 wt.-% of a linear low density polyethylene (LLDPE)-ExxonMobil™ LLDPE 1001.32 (ExxonMobil Chemical Company, Houston, Tex., USA)+10 wt.-% of an anhydride modified linear low density polyethylene-Bynel® CXA 41E710 (E.I. du Pont de Nemours and Company, Inc., Wilmington, Del., USA).

Layer 107: 97 wt.-% of a nylon 6-Ultramid® B36 01 (BASF Polyamides and Intermediates, Freeport, Tex., USA)+3 wt.-% of processing aids.

Bottom Sheet

This example is one embodiment of a second flexible embossed sheet 200 of the present invention having a layer sequence (in the order as shown below) and layer compositions as described below and as illustrated in FIG. 9. Reported below is the layer composition relative to the total weight of the layer.

Layer 201 (Sealant): 98 wt.-% of an ionomer-SURLYN® 1601 (du Pont de Nemours and Company, Wilmington, Del., U.S.A.)+2 wt.-% of processing aids.

Layer 202: 100 wt.-% of a linear low density polyethylene (LLDPE)-ExxonMobil™ LLDPE 1001.32 (ExxonMobil Chemical Company, Houston, Tex., USA).

Layer 203: 100 wt.-% of a linear low density polyethylene (LLDPE)-ExxonMobil™ LLDPE 1001.32 (ExxonMobil Chemical Company, Houston, Tex., USA).

Layer 204: 54 wt.-% of a linear low density polyethylene (LLDPE)-DOWLEX™ 2056G (Doe Chemical Company, Midland, Mich., USA), 30 wt.-% of an ethylene vinyl acetate copolymer (EVA)-Petrothene® NA442 (Equistar Chemicals, LP, Houston, Tex., USA)+16 wt.-% of an anhydride modified linear low density polyethylene-Bynel® CXA 41E710 (E.I. du Pont de Nemours and Company, Inc., Wilmington, Del., USA).

Layer 205: 100 wt.-% of a nylon 6-Ultramid® B36 01 (BASF Polyamides and Intermediates, Freeport, Tex., USA).

Layer 206: 100 wt.-% of an ethylene vinyl alcohol copolymer (EVOH)-Soarnol™ AT 4403 (Soarus L.L.C., Arlington Heights, Ill., USA).

Layer 207: 100 wt.-% of a nylon 6-Ultramid® B36 01 (BASF Polyamides and Intermediates, Freeport, Tex., USA).

Layer 208: 90 wt.-% of a linear low density polyethylene (LLDPE)-ExxonMobil™ LLDPE 1001.32 (ExxonMobil Chemical Company, Houston, Tex., USA)+10 wt.-% of an anhydride modified linear low density polyethylene-Bynel® CXA 41E710 (E.I. du Pont de Nemours and Company, Inc., Wilmington, Del., USA).

Layer 209: 97 wt.-% of a nylon 6-Ultramid® B36 01 (BASF Polyamides and Intermediates, Freeport, Tex., USA)+3 wt.-% of processing aids.

Once the bottom sheet has been produced as a flat sheet, it is then embossed using methods well-known to those skilled in the art. In this regard, a conventional method of producing the embossed surface topography of the bottom sheet may include passing the flat bottom sheet between a male and a female compression cylinder where one of the cylinders has a surface with an "inverse or negative" engraving of the desired surface topography of the final embossed bottom sheet. The protrusions projecting outwardly from the engrave surface of the male cylinder produces the desired valleys of the final embossed bottom sheet. One or both cylinders may be heated to a temperature sufficient to soften, but not melt the plastic material of the bottom sheet. The compression forces along with the temperature of one or both cylinders may be adjusted as needed. A vacuum may be advantageously applied in the area of the protrusions to draw the heated sheet into the protrusions to form deeper valleys and/or to improve the definition of each individual liquid containment cell.

Packages according to the present invention may be fabricated by packaging manufacturing methods well-known in the art. Preferred methods of package formation include, but are not limited to, form-fill-seal and vacuum packaging equipment and techniques generally well-known in the art. Form-fill-seal methods may include horizontal and vertical form-fill-seal equipment and processes known to those skilled in the art.

The water and/or grease retaining capacity of the embossed bottom sheets of the present invention compared to an un-embossed bottom sheet (Control) are reported below in Table 1. Example 1 is an embossed bottom sheet having a diamond shape pattern extending continually across the entire surface as illustrated in FIG. 4. Example 2 is an embossed sheet having a cross-hatched pattern extending continually across the entire surface as illustrate in FIG. 5. The embossed sheets and un-embossed sheet tested had a film structure that was identical to that described above for Example 2. The test method for the measurement of this characteristic is set forth in the following paragraph.

Each sheet was cut into a 5 inch by 5 inch test specimen. Each test specimen was secured to a flat clipboard with adhesive tape such that there was a 0.375 inch overhang of the test specimen at the edge of the clipboard. The weight of the test specimen and clipboard was measured. Bacon grease (Hot Belly Bacon Grease purchased from Gi Gi Bacon Grease, LLC, Madisonville, La., USA) was heated to a temperature of approximately 52° C. (126° F.) and a 5-gram aliquot of heated grease was applied to the test specimen and spread evenly across the surface of the specimen. After about 30 seconds, the clipboard and test specimen were tilted to an angle of 20° for another 30 seconds. The weight of grease that was not retained by the test specimen and flowed off the overhang of the specimen was recorded. Table 1 reports the amount of grease which was not retained by the test specimen.

TABLE 1

|  | #1 | #2 | #3 | #4 | #5 | AVG. |
|---|---|---|---|---|---|---|
| Control (grams) | 12 | 15 | 14 | 14 | 14 | 13.8 |
| Example 1 (grams) | 0 | 0.5 | 8 | 6 | 6 | 4.1 |
| Example 2 (grams) | 4 | 4 | 6 | 5 | 3 | 4.4 |

Based upon the amount of grease that was not retained on the embossed test specimens compared to that for the un-embossed test specimen, it is evident that embossing significantly improves the liquid containment capacity of the bottom sheet. In view of the specific dimensions of the individual liquid containment cells and the number of individual liquid containment cells of the diamond pattern and double cross-hatched patterns of Examples 1 and 2, respectively, the amount of water and/or grease retained by the flexible embossed bottom sheet of the present invention was at least 155 g/m$^2$ (0.10 g/in$^2$) or at least 232.5 g/m$^2$ (0.15 g/in$^2$) and each of the individual liquid containment cells had a volume of at least 1.64 mm$^3$ (0.0001 in$^3$), at least 3.3 mm$^3$ (0.0002 in$^3$) or about 4.7 mm$^3$ (0.00029 in$^3$).

The above description and examples illustrate certain embodiments of the present invention and are not to be interpreted as limiting. Selection of particular embodiments, combinations thereof, modifications, and adaptations of the various embodiments, conditions and parameters normally encountered in the art will be apparent to those skilled in the art and are deemed to be within the spirit and scope of the present invention.

What is claimed:

1. A flexible package for packaging a food product, the package comprising:
   a flexible top sheet sealed to a flexible bottom sheet; wherein each of the top and bottom sheets has:
   a thickness of between 12.7 μm and 305 μm (0.5 mil and 12 mil);
   a bending resistance of between 5 and 5000 Gurley Units in either the machine or transverse direction;
   a heat resistance to melting up to a temperature of at least 100° C. (212° F.);
   wherein the bottom sheet has a food-contact surface comprising:
   a plurality of embossed peaks and valleys wherein each valley has a defined perimeter with a valley base integrally connected to a valley wall which thereby defines an individual liquid containment cell; wherein the number of liquid containment cells per square inch of the bottom sheet is at least 10; wherein the food-contact surface has a reduced food contact-surface area that reduces a pre-embossed food-contact surface area by at least 20% to facilitate the retention of water and/or grease released by the food product.

2. A package according to claim 1, wherein the amount of water and/or grease retained by the bottom sheet is at least 155 g/m$^2$ (0.10 g/in$^2$).

3. A package according to claim 1, wherein the amount of water and/or grease retained by the bottom sheet is at least 232.5 g/m$^2$ (0.15 g/in$^2$).

4. A package according to claim 1, wherein the number of individual liquid containment cells square inch of the bottom sheet is at least 25.

5. A package according to claim 1, wherein the number of individual liquid containment cells per square inch of the bottom sheet is at least 50.

6. A package according to claim 1, wherein the food-contact surface has a reduced food contact surface area that reduces a pre-embossed food contact surface area by at least 25%.

7. A package according to claim 1, wherein the food-contact surface has a reduced food contact surface area that reduces a pre-embossed food contact surface area by at least 30%.

8. A package according to claim 1, wherein the food-contact surface has a reduced food contact surface area that reduces a pre-embossed food contact surface area by at least 40%.

9. A package according to claim 1, wherein the food-contact surface has a reduced food contact surface area that reduces a pre-embossed food contact surface area by at least 50%.

10. A package according to claim 1, wherein the bottom sheet comprises channels.

11. A package according to claim 1, wherein each of the individual liquid containment cells has a polygon shape.

12. A package according to claim 11, wherein the individual liquid containment cells are formed as a polygon pattern continuously across the bottom sheet.

13. A package according to claim 11, wherein each of the individual liquid containment cells has a diamond shape.

14. A package according to claim 11, wherein each of the individual liquid containment cells has a hexagon shape.

15. A package according to claim 1, wherein each of the individual liquid containment cells includes a volume of at least 1.64 mm$^3$ (0.0001 in$^3$).

16. A package according to claim 1, wherein each of the individual liquid containment cells includes a volume of at least 3.3 mm$^3$ (0.0002 in$^3$).

17. A package according to claim 1, wherein each of the individual liquid containment cells includes a volume of about 4.7 mm$^3$ (0.00029 in$^3$).

18. A package according to claim 1, wherein the bending resistance of between 5 and 2000 Gurley Units in either the machine or transverse direction.

19. A package according to claim 1, wherein each of top and bottom sheets comprises a film having an oxygen transmission rate of between 0 and 10 cm$^3$/m$^2$/24 hours at 1 atmosphere, 0% relative humidity and 10° C.

20. A package according to claim 1, wherein the top sheet is peelably sealed to the bottom sheet.

* * * * *

UNITED STATES PATENT AND TRADEMARK OFFICE
CERTIFICATE OF CORRECTION

PATENT NO. : 10,486,885 B2
APPLICATION NO. : 15/531508
DATED : November 26, 2019
INVENTOR(S) : Peter M. Chen, Jay D. Hudson and Otacilio T. Berbert Page 1 of 1

It is certified that error appears in the above-identified patent and that said Letters Patent is hereby corrected as shown below:

On the Title Page

Item (57) ABSTRACT, replace "sheet The" with -- sheet. The --

In the Specification

Column 9, Line 58, replace "Doe" with -- Dow --

Signed and Sealed this
Eighth Day of February, 2022

Drew Hirshfeld
*Performing the Functions and Duties of the
Under Secretary of Commerce for Intellectual Property and
Director of the United States Patent and Trademark Office*